United States Patent [19]
Crookston et al.

[11] 3,718,489
[45] Feb. 27, 1973

[54] INSULATING CASTABLE

[75] Inventors: James A. Crookston; Glen W. Charles, both of Mexico, Mo.

[73] Assignee: A. P. Green Refractories Co., Mexico, Mo.

[22] Filed: Jan. 4, 1971

[21] Appl. No.: 103,793

[52] U.S. Cl. ..................106/64, 106/65, 106/67, 106/104
[51] Int. Cl. ..................C04b 35/02, C04b 35/10
[58] Field of Search..................106/64, 104, 65, 67

[56] References Cited

UNITED STATES PATENTS 3,341,339   9/1967   Stein ........................106/64

Primary Examiner—James E. Poer
Attorney—Gravely, Lieder & Woodruff

[57] ABSTRACT

The disclosure concerns an insulating refractory castable useable at temperatures above 2,800°F., and specifically an insulating refractory castable useable at 3,000°F. which has a bulk density of from 82 to 88 pounds per cubic foot in place. The product comprises 60–70 percent of a size graded acid and/or alumina refractory aggregate, 5 to 15 percent expanded clay aggregate of a density of from 9–11 pounds per cubic foot, and from 15 to 35 percent calcium aluminate cement.

6 Claims, No Drawings

INSULATING CASTABLE

BACKGROUND OF THE INVENTION

This invention provides methods of economically producing a 3,000°F. insulating refractory castable having a bulk density of from 82 to 88 pounds per cubic foot in place. It has been difficult to produce a 3,000°F. insulating refractory castable using conventional formations, and it has been particularly difficult to form 2,800°F. – 3,000°F. castables which hold up and retain their usefulness when exposed to these temperatures in use over long periods of time. However, this invention uses a size graded non-basic aggregate combined with from about 5 to about 15% of an expanded clay aggregate having a density from about 9 to about 11 pounds per cubic foot to produce an insulating castable useful at 2,800°F. – 3,000°F. over extended service periods.

The invention is also useable in producing a 2,800°F. insulating refractory castable using a formulation which falls within the general ranges hereinbefore set forth. The use of expanded clay aggregate allows more economical formulation of the lower temperature product and allows for the formulation of the 3,000°F. insulating refractory castable for the first time.

SUMMARY OF THE INVENTION

The present invention comprises an insulating refractory castable comprising 60–70 percent size graded non-basic aggregate, 5–15 percent expanded clay aggregate and 15–35 percent calcium aluminate cement. The invention further comprises the processes and compositions hereinafter set forth.

DETAILED DESCRIPTION

The present composition comprises a non-basic size graded aggregate which may be selected from the following materials: calcined alumina, calcined South American bauxite, calcined diaspore, burley diaspore, kyanite and other fire-clay, and silica-alumina refractory materials. When the aggregate contains super duty fire clay, according to ASTM standards, the clay must have a Pyrometric Cone Equivalent of at least Cone 33.

This aggregate has a typical size gradation as follows:

|  | PREFERRED | RANGE |
|---|---|---|
| Held on 10 mesh | 11.0% | 11.0 ± 3.0% |
| Pass 10 on 28 mesh | 56.0% | 56.0 ± 3.0% |
| Pass 28 on 65 mesh | 23.0% | 23.0 ± 3.0% |
| Pass 65 mesh | 10.0% | 10.0 ± 3.0% |

The composition also includes from about 5 to about 15 percent expanded clay aggregate. This material has a density of about 9 to about 11 pounds per cubic foot and has a typical chemical analysis as follows:

|  | PREFERRED | RANGE |
|---|---|---|
| Silica ($SiO_2$) | 56% | 52–58% |
| Alumina ($Al_2O_3$) | 40% | 38–42 |
| Iron oxide ($Fe_2O_3$) | 2.% | 1.7–2.2 |
| Lime (CaO) | 1% | 0.6–1.1 |
| Alkalies ($Na_2O \pm K_2O$) | 1% | 0.8–1.2 |

It has a size gradation as follows:

|  | PREFERRED | RANGE |
|---|---|---|
| Held on 4 mesh | Trace | 0-Trace |
| Pass 4 on 10 mesh | 12 | 12 ± 3% |
| Pass 10 on 28 mesh | 88 | 88 ± 3% |
| Pass 28 on 65 mesh | Trace | 0-Trace |
| Pass 65 mesh | Trace | 0-Trace |

The expanded clay aggregate is made from Missouri plastic clay preferably, but it can be made from flint clay, kaolin and ball clay.

The expanded clay aggregate is described in U.S. Pat. No. 3,046,607 and is made by first pulverizing the clay to about 65 mesh, blending it with flour or starch to provide a material which will form a gas at high temperatures, tempering the blend with water, extruding the blend into very thin (about 0.03 – 0.04 diameter) strings of spaghetti-like clay, drying the strands of clay, crushing the strands to short pieces (about 3 or 4 to 1 ratio of length to diameter), screening out fines, and dropping through a vertical high temperature (3,000°F. or so) furnace. This heat treatment seals the surface of the clay pellets before the starch or flour oxidizes, thus allowing the gas formed to expand the clay pellet. A suitable commercial product is GREENLITE aggregate made by A. P. Green Refractories Company.

The composition also contains about 15 to about 35% calcium aluminate cement. This cement is a conventional item of commerce and is known as CA–25 cement. The typical chemical analysis of this calcium aluminate cement is as follows (by weight on the basis of an oxide analysis):

| | |
|---|---|
| Silica ($SiO_2$) | 0.1% |
| Alumina ($Al_2O_3$) | 79.0% |
| Iron Oxide ($Fe_2O_3$) | 0.3% |
| Lime (CaO) | 18.0% |
| Magnesia (MgO) | 0.4% |
| Alkalies ($Na_2O$) | 0.5% |
| LOI (1100°C) | 1.5% |

Best results are obtained when the expanded clay aggregate (9–11 p.c.f. density) is from 5 to 15 percent and the calcium aluminate cement is from 15 to 35 percent by weight of the total dry batch weight.

Above about 15 percent expanded clay aggregate (9–11 p.c.f.) causes lower density, a decrease in refractoriness and strength, and poor workability for casting or gunning of the mix. Above about 35 percent calcium aluminate cement will increase the cost and density of the mix. Below about 5 percent expanded clay aggregate (9–11 p.c.f.) increases the density of the mix so that it cannot be considered an insulating castable. Below about 15 percent calcium aluminate cement causes lower strength and poor workability of the mix for casting or gunning.

A typical castable usable at 3,000°F, will contain in the aggregate portion raw kyanite, calcined fireclay and calcined alumina. A 3,000°F. castable has a screen analysis of about 0.5 to 10 5 percent +10 mesh, about 38 to about 48.5 percent −10 +65 mesh and about 51 to about 57 percent −65 mesh.

Following are two specific examples of products made in accordance with this invention. Example No. 1 is an insulating refractory castable which is usable at 3,000°F. Example No. 2 is an insulating refractory castable which has a useful temperature limit of about 2,800°F.

In formulating both of these compositions, the products are dry blended and bagged. The bagged product then is mixed with water at the installation site as set forth in the examples and poured into place.

The various tests are standard modulus of rupture, cold crushing strength and linear change tests accepted in the industry.

The weights are on a dry basis and the moisture is calculated as added moisture.

The 631-K is a Missouri superduty flint clay which has been calcined at a temperature in excess of 2,600°F. The terms 100/F, 325/F, 35/F and 9/F means that the materials have been ground to 100 mesh, 325 mesh, 35 mesh and 9 mesh respectively, and the materials include all fines below that mesh. To be more specific, 100/F includes all material finer than 100 mesh which results from the crushing operation.

BM-48 mesh is 631-K material ball milled to minus 48 mesh size.

Refcon cement is a calcium aluminate cement having a typical analysis as follows:

| | Typical |
|---|---|
| Silica ($SiO_2$) | 5.3% |
| Alumina + Titania ($Al_2O_3 + TiO_2$) | 56.0% |
| Iron Oxide ($Fe_2O_3$) | 1.59 |
| Lime (CaO) | 36.30 |
| Magnesia (MgO) | 0.16 |
| Alkalies ($Na_2O + K_2O$) | 0.03 |
| LOI | 0.62 |

| | EX. NO. I | EX. NO. II |
|---|---|---|
| Expanded Aggregate (9-11 pcf) | 10.0 | 8.0 |
| Raw Kyanite 100/F | 25.0 | 25.0 |
| CA-25 Cement | 25.0 | 15.0 |
| Calcined Missouri superduty flint clay (631-K) 9/F | 27.5 | — |
| Calcined Alumina, 325/F | 2.5 | 2.5 |
| Raw Kyanite, 35/F | 10.0 | 10.0 |
| Calcined Missouri superduty fline clay (631-K) BM-48 mesh | — | 32.0 |
| Refcon Cement | — | 7.5 |
| Moisture (Added) | 18.5% | 22.0% |
| Bulk Density, pcf | | |
| After Drying at 220°F | 90 | 85.9 |
| After reheating at 1500°F | 85 | 82.2 |
| Modulus of Rupture, psi | | |
| After drying at 220°F | 300 | 230 |
| After reheating at 1500°F | 210 | 178 |
| After reheating at b 2000°F | 230 | 183 |
| After reheating at 2500°F | 470 | 478 |
| Cold Crushing Strength, psi | | |
| After drying at 220°F | 1250 | 1066 |
| After reheating at 1500°F | 920 | 912 |
| After reheating at 2000°F | 810 | 825 |
| Linear Change, % (from mold size) | | |
| After reheating at 1500°F | −0.11 | −0.18 |
| After reheating at 2000°F | −0.20 | −0.26 |
| After reheating at 2500°F | +2.20 | +1.50 |
| After reheating at 2700°F | — | −0.40 |
| After reheating at 2900°F | +1.50 | — |

Screen Analysis:

| | | |
|---|---|---|
| Retained on 10 mesh | 3.0 | 1.5% |
| −10 + 65 mesh | 42.0 | 15.1% |
| Pass 65 mash | 57.0 | 83.5% |

What is claimed is:

1. An insulating refractory castable comprising:
   a. about 60 to about 70 percent size graded aggregate selected from the group consisting of acid refractory aggregate, alumina refractory aggregate and mixtures thereof,
   b. about 5 to about 15 percent expanded fireclay of about 9 to about 11 pounds per cubic foot density, and
   c. 15–35 percent calcium aluminate cement,
   d. said refractory being usable at above about 2,800°F. and having a bulk density of about 82 to about 88 pounds per cubic foot in place after heating at 1,500°F.

2. The castable of claim 1 wherein the aggregate includes raw kyanites, calcined fireclay and calcined alumina and the castable has a screen analysis of from about 0.5 to about 5 percent +10 mesh, about 38 to about 48.5 percent −10 +65 mesh, and about 51 to about 57 percent −65 mesh, said castable being usable at 3,000°F.

3. The castable of claim 1 wherein the aggregate contains raw kyanites, calcined fireclay, and calcined alumina and the castable has a screen analysis of about 3 percent +10 mesh, about 40 percent −10 +65 mesh and about 57 percent −65 mesh, said castable being usable at 3000°F.

4. The castable of claim 1 wherein the aggregate includes raw kyanites, calcined fireclay, and calcined alumina and the castable has a screen analysis of about 1.5 percent +10 mesh, about 15 percent −10 +65 mesh and about 83.5 −65 mesh, said castable being usable at about 2,800°F.

5. The castable of claim 1 wherein the expanded clay has a size gradation of −4 +10 mesh of about 9 to about 15 percent and −10 +28 mesh of about 85 to about 91 percent.

6. The castable of claim 1 wherein the aggregate has a size gradation of +10 mesh, about 8 to about 14 percent −10 +28 mesh of about 53 to about 59 percent, −28 +65 mesh of about 20 to about 28 percent, and −65 mesh of about 7 to about 11 percent.

* * * * *